X0009798
C. M. Keller,
Making Stares.
Patented June 29. 1836.
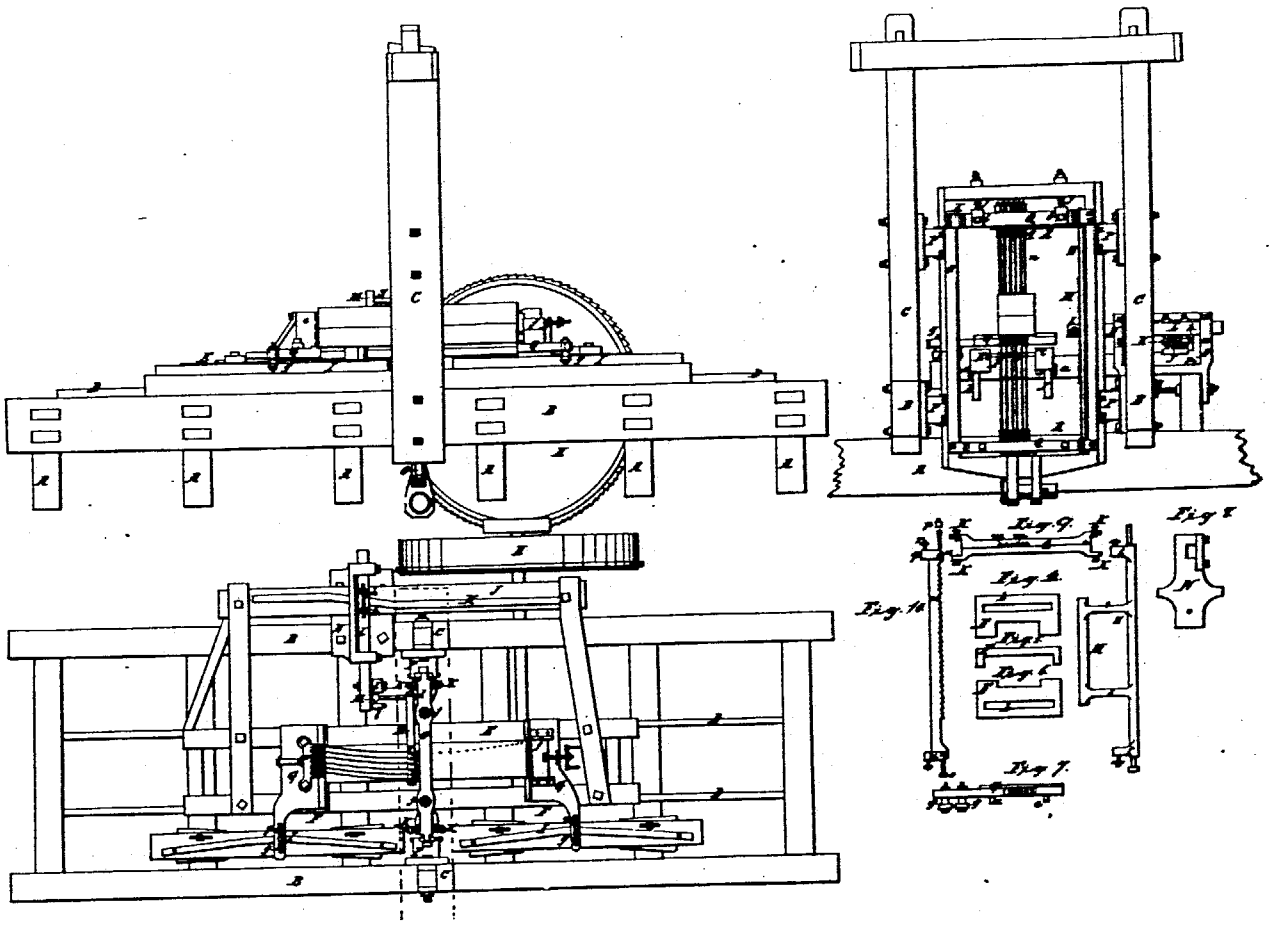
A.M. PHOTO-LITHO. CO. N.Y. (ORIGINAL PROOF)

9798 X

Charles M. Keller.
Letters Patent. Patented June 29, 1836.

The Schedule referred to in these Letters Patent and making part of the same containing a description in the words of the said Charles M. Keller him self, of his improvement in the Machine for Sawing Bilged Staves.

---

To all to whom these Presents shall come: Be it known that I, Charles M. Keller, of Washington in the County of Washington and District of Columbia have invented a new and useful improvement in the Machine for Sawing Bilge Staves and that the following is a full and exact description of the construction and operation of the same: reference being had to the accompanying drawings ma king part of this Specification.

The improvements consist in giving to the blocks of wood at the time of bein sawed into Staves, a double motion. One at right angles to the other, [illegible] will produce the shape desired for a Bilged Stave; and also in imparting to the gang of saws a vibratory motion, which will accommodate their direction to the Figure formed by the compound motion of the Blocks.

In the accompanying drawings, Figure 1, is a plan of the Machine Fig ure 2, a side elevation Figure 3, a cross section, just in front of the fender posts. The other Figures will be referred to under their appropriate heads.

(The same letters are indicative of the same parts in all the Figures

Scale of drawings 1½ in. to the foot.

A, represents the joists of the building, to which the bed B of the machine is firmly secured, by bolts or otherwise. C, C, are the fender posts and D, D, the carri age ways. these parts constituting the frame work of the machine, should be ma of strong timber or cast iron and secured together in such a manner as to prev as much as possible, all jarring or trembling motion. E, is a carriage running in a straight line on the ways D, D, confined in its rectilinear motion by chat a, a, to which are attached two metallic plates F, F, seen in section at Figs 4, 5, & 6, each having a slot b. On these plates are placed the head and tail bl G, G, having projections c, c, see fig. 7, on their under sides fitting into the slots b, b. The upper surface of the plates and the under surface of the head and t blocks should be planished and the slots b, b and projections c, c, should
be made to fit truly, so as to cause the head and tail blocks to slide ea[illegible]
and without wabbling at right angles to the carriage B. The dogs o[illegible]
the head and tail blocks, and by which the block or blocks designed [illegible]
staves are made fast, are seen at e, F f, and may be altered at pleasure
as the mode of fastening is not material.

The carriage B, may be moved back and forth in the same man[illegible]
ner as the carriage of a saw mill, viz. by a rag wheel, pinion, and rack.
The rag wheel is represented at H. There is a slot in one end of the head [illegible]
tail blocks, in which are fixed the spindles of two rollers 8:8; with [illegible]
and nuts for the purpose of setting them. These rollers are each side of [illegible]
stave guides I.I. These guides are made of iron, and bolted each to a [illegible]
of hard wood which is let into the bed of the machine, and regulated [illegible]
wedges. To each end of the carriage, is attached an arm of wood or iron [illegible]
tending beyond the fender post to which the saw guide bar J, is bolted. The
guide K is either cast with the bar J, or attached to it so as to form [illegible]
The shape of the saw guide will always be governed by the stave guides, and
length of the lever (to be hereafter described) which gives motion to the saws. [illegible]
slide L is provided with two sets of rollers h, h at one end, playing on each side [illegible]
the saw guide, and two others i, i, playing on each side of the bar M. This [illegible]
It moves in an iron frame N, see fig. 1.

The saw gate O which is made of cast iron, and works in cheeks P, P, P, P
which are bolted to the fender posts is put in motion by a pitman which conne[illegible]
the machine with the moving power. There are two cross heads Q, Q affixed to [illegible]
gate. The one at the bottom is firmly bolted in its place, and the one at top is m[illegible]
to slide up or down, and regulated by the screws j, j and is provided at each e[illegible]
with set screws k, k. These cross heads are made in two pieces as seen at [illegible]
and kept together by the screw bolts l, l. Six holes, very accurately bored th[illegible]
the cross heads, and in which the saw hangers work, are seen at m m [illegible]
these hangers the saws n, n, are attached, see fig. 10. The hangers in the [illegible]
cross head, have heads turned on them, as at o, and those on the upper [illegible]
screws cut on their ends, furnished with nuts and washers, (see p fig. 10) an[illegible]

small feather which prevents the vibratory motion of the hangers from affecting the screws. The hangers q,q, have round pins working into holes made in two connecting bars R,R.

On one side of the saw gate is a tumbling shaft S, with gudgeons at each end working in holes made in the cross heads, on a line with the holes in which the hangers work. There are two arms S,S, extending from the tumbling shaft, to the end of which is attached the round bar of iron M, which plays between the rollers i,i before described. Near each extremity of the tumbling shaft is a lever t,t, with a pin working into a hole in the ends of the connecting bar.

The saws N,N, are connected with the hangers by pins, as seen at n,n fig 10

Operation. The blocks of wood being cut to the length required for staves in width sufficient to prevent the saws from cutting out at the sides, and in thickness a little more than the width of a stave, are successively placed on the head and tail blocks and secured in their places by the dogs. The saw gate is then set in motion, and when in readiness, the block is impelled against the saws by the motion of the carriage, which is in a direct line towards them. The head and tail blocks, however, are movable in the slots, which are at right angles with the motion of the carriage, and are governed in this, their lateral motion or position by the shape of the curve of the stave guides.

As the friction rollers in the head and tail blocks act on each side of the stave guides, it is evident that as the carriage advances these blocks, together with the block which is changing its character into staves, has a motion at right angles to the motion of the carriage, the sum of which two motions describes a curve similar to that of the stave guides, and that the saws by cutting this described curve leave the block of wood in the form of staves.

The change of direction or vibration of the saws which accommodates them to the above described curve is obtained by means of the saw guide K, which being firmly connected with and moved by the carriage B, gives motion to the bar M on the tumbling shaft, by means of the slide L, which motion causes the saws to vibrate or change the direction in which they cut according to the shape of the guide K.

As the curve given to the staves is produced by two motions at right angwith each other any number of saws may be used in a gang without affecting the curve, which will uniformly be the same, or may be altered at pleasure by changing the shape of the stave guides and saw guide. The thickness of the stave will be regulated by the distance between the saws.

One, two or more blocks may be cut through at the same time by increasing the length of the saws.

The construction of the machine can be altered without affecting its principles.

What I claim as my Invention is the Double Motion, one at right angles to the other, given to the block of wood, by which the curve of the stave is produced, and also the giving to a gang of saws a vibratory motion, which accommodates them to the curve produced by the compound motion in combination.

Witnesses
B. K. Morsell
B. Tucker

Chs. M. Keller

Exd. M.G.K.
(Rec.d & Recorded anew May 26. 1840.) (1550 words (Drawing)